United States Patent
Caspers et al.

(10) Patent No.: US 6,960,546 B2
(45) Date of Patent: *Nov. 1, 2005

(54) DIELECTRIC COMPOSITE MATERIALS INCLUDING AN ELECTRONICALLY TUNABLE DIELECTRIC PHASE AND A CALCIUM AND OXYGEN-CONTAINING COMPOUND PHASE

(75) Inventors: Christopher Caspers, Toledo, OH (US); Elijah Underhill, Columbia, MD (US); Xubai Zhang, Ellicott City, MD (US)

(73) Assignee: Paratek Microwave, Inc., Columbia, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/256,974

(22) Filed: Sep. 27, 2002

(65) Prior Publication Data

US 2004/0063566 A1 Apr. 1, 2004

(51) Int. Cl.⁷ .......................... C04B 35/495; C04B 35/49
(52) U.S. Cl. .................... 501/135; 501/136; 501/137; 501/138; 501/139
(58) Field of Search ................................ 501/134–139

(56) References Cited

U.S. PATENT DOCUMENTS

| | | | |
|---|---|---|---|
| 5,312,790 A | 5/1994 | Sengupta et al. | 501/137 |
| 5,403,796 A | 4/1995 | Takahashi et al. | 501/136 |
| 5,427,988 A | 6/1995 | Sengupta et al. | 501/137 |
| 5,486,491 A | 1/1996 | Sengupta et al. | 501/137 |
| 5,593,495 A | 1/1997 | Masuda et al. | 117/4 |
| 5,635,433 A | 6/1997 | Sengupta | 501/137 |
| 5,635,434 A | 6/1997 | Sengupta | 501/138 |
| 5,640,042 A | 6/1997 | Koscica et al. | 257/595 |
| 5,693,429 A | 12/1997 | Sengupat et al. | 428/699 |
| 5,694,134 A | 12/1997 | Barnes | 343/700 |
| 5,766,697 A | 6/1998 | Sengupta et al. | 427/585 |
| 5,830,591 A | 11/1998 | Sengupta et al. | 428/701 |
| 5,846,893 A | 12/1998 | Sengupta et al. | 501/137 |
| 5,886,867 A | 3/1999 | Chivukula et al. | 361/311 |
| 5,990,766 A | 11/1999 | Zhang et al. | 333/205 |
| 6,074,971 A | 6/2000 | Chiu et al. | 501/139 |
| 6,251,816 B1 * | 6/2001 | Maher et al. | 501/138 |
| 6,335,302 B1 * | 1/2002 | Satoh et al. | 501/137 |
| 6,377,142 B1 | 4/2002 | Chiu et al. | 333/238 |
| 6,377,217 B1 | 4/2002 | Zhu et al. | 343/700 |
| 6,377,440 B1 | 4/2002 | Zhu et al. | 361/311 |
| 6,404,614 B1 | 6/2002 | Zhu et al. | 361/277 |
| 6,451,721 B2 * | 9/2002 | Kawabata et al. | 501/135 |
| 6,492,883 B2 | 12/2002 | Liang et al. | 333/132 |
| 6,514,895 B1 | 2/2003 | Chiu et al. | 501/137 |
| 6,525,630 B1 | 2/2003 | Zhu et al. | 333/205 |
| 6,531,936 B1 | 3/2003 | Chiu et al. | 333/164 |
| 6,535,076 B2 | 3/2003 | Partridge et al. | 333/17.1 |
| 6,538,603 B1 | 3/2003 | Chen et al. | 342/372 |
| 6,737,179 B2 * | 5/2004 | Sengupta | 428/702 |
| 6,774,077 B2 * | 8/2004 | Sengupta et al. | 501/137 |

FOREIGN PATENT DOCUMENTS

| | | |
|---|---|---|
| EP | 0 275 053 A1 | 7/1988 |
| GB | 2 208 644 A | 4/1989 |
| WO | WO 02/059059 A2 | 8/2002 |

OTHER PUBLICATIONS

Sengupta L.C. et al. "Breakthrough Advances in Low Loss, Tunable Dielectric Materials" Materials Research Innovations, Springer, Heidelberg DE, vol. 2, No. 5, Mar. 1999, pp 278–282.

U.S. Appl. No. 09/620,776, filed Jul. 21, 2000, Sengupta et al.

* cited by examiner

Primary Examiner—Karl Group
(74) Attorney, Agent, or Firm—Alan G. Towner; Michael N. Haynes; James S. Finn

(57) ABSTRACT

Dielectric composite materials including an electronically tunable dielectric phase and a calcium and oxygen-containing compound are disclosed. The tunable phase may comprise a material such as barium strontium titanate. The calcium/oxygen compound may comprise CaO or a transition metal-containing compound such as $Ca_2Nb_2O_7$ or $CaTiO_3$. The material may also include a rare earth oxide dopant such as $CeO_2$. The materials resist dielectric breakdown and possess improved combinations of electronic properties. The materials may be tailored for specific applications.

30 Claims, No Drawings

DIELECTRIC COMPOSITE MATERIALS INCLUDING AN ELECTRONICALLY TUNABLE DIELECTRIC PHASE AND A CALCIUM AND OXYGEN-CONTAINING COMPOUND PHASE

FIELD OF THE INVENTION

The present invention relates to electronically tunable dielectric materials, and more particularly relates to dielectric composite materials including an electronically tunable dielectric phase and a calcium and oxygen-containing compound phase. The materials may also include a rare earth oxide dopant.

BACKGROUND INFORMATION

Microwave devices such as electronically scanning antennas, phased array antennas, electronic down tilt antennas, electronically tunable filters, electronically tunable radar and tunable oscillators have been proposed for use, but their high costs have prevented widespread commercial implementation. The existence of low cost tuning technology would revolutionize the industry of microwave components and antennas.

Tuning refers to the ability to change the dielectric constant of a material. This translates in the microwave component field as the ability to use the same component and change the frequency of operation by changing the input voltage or current. It can allow for a single filter to frequency-hop during operation. For antennas, being able to tune using low cost technology would create a new class of phased array antennas, which could be used in common households instead of being limited to large, expensive systems. Phased array antennas can be described as electronically scanning antennas. By using electronically scanning antennas, satellite communications can be available in many situations, because the antennas would allow for tracking of a satellite. This means voice and data communications can be done in a mobile arena. Also, mobile communications would be available at a global level without the need for major infrastructure.

A phased array refers to an antenna configuration composed of a large number of elements that emit phased signals to form a radio beam. The radio signal can be electronically steered by the active manipulation of the relative phasing of the individual antenna elements. This electronic beam steering concept applies to both the transmitter and the receiver. Phased array antennas are advantageous in comparison to their mechanical counterparts with respect to their speed, accuracy and reliability. The replacement of gimbal mounted mechanical antennas by phased array antennas increases survivability through more rapid and accurate target identification. For example, complex tracking exercises can be performed rapidly and accurately with a phased array antenna system.

Future communications will also require wideband communications using frequency-hopping techniques, so that large amounts of digital data can be transferred over the band. A critical component for these applications is a low cost, fast acting tunable filter. Digital data could be distributed or encoded over a band of frequencies in a sequence determined by control circuitry of the tunable filter. This would allow for several users to transmit and receive over a common range of frequencies.

Technologies for scanning that could possibly be adapted for phase shifter applications are ferrite phase shifters and semiconductor diode phase shifters. Although ferrites are currently the most widely used type of phase shifter materials, they are mostly limited to military applications. The major reason for this is that they are very expensive to manufacture. Secondary reasons include the fact that they are not designed to work in a broadband situation. When the frequency changes, a new set of materials has to be designed and manufactured. They are also very bulky in size and heavy. Furthermore, such phase shifters are difficult or impossible to make in a planar configuration. Conventional ferrites are also driven by high power due to the fact that they activate based on current.

Conventional diode phase shifters are also high cost because they require active electronic circuits to be added to designs in order to compensate for their high loss at microwave frequencies. They do not have good power handling characteristics. When power is put through the diodes, they start to behave in a very non-linear fashion, or they break down. Diodes also require holding power in order to maintain accuracy, as well as power during switching.

Barium titanate is one of the known ceramics tunable at room temperature. Another known tunable ceramic is strontium titanate. However, this material by itself must be super cooled in order to have usable tuning characteristics. Other tunable dielectrics include lead zirconium titanates (PZT), lead lanthanum zirconium titanates (PLZT), $PbTiO_3$, $KNbO_3$, $LiTaO_3$, $BaCaZrTiO_3$, $NaNO_3$ and other ferroelectric perovskites. The problem with these known ferroelectrics is that their losses are very high at room temperature. This makes these materials essentially useless at microwave frequencies. One way to combat this problem is by means of producing a low loss but still tunable composite material with reasonable dielectric constants.

Barium strontium titanate (BSTO) has been used for its high dielectric constant, on the order of 200 to 6,000, and its large change in dielectric constant with applied voltage, on the order of 25 to 75 percent at a field of 2 V/micron. Some prior art ferroelectric composite materials which include BSTO are disclosed in U.S. Pat. No. 5,427,988 to Sengupta et al. entitled "Ceramic Ferroelectric Composite Material BSTO—MgO"; U.S. Pat. No. 5,645,434 to Sengupta et al. entitled "Ceramic Ferroelectric Composite Material BSTO-Magnesium Based Compound"; U.S. Pat. No. 6,074,971 to Chiu et al. entitled "Ceramic Ferroelectric Composite Materials with Enhanced Electronic Properties BSTO—Mg Based Compound—Rare Earth Oxide"; and U.S. patent application Ser. No. 09/594,837 to Chiu et al. filed Jun. 15, 2000 entitled "Electronically Tunable Ceramic Materials Including Tunable Dielectric and Metal Silicate Phases", each of which is incorporated herein by reference.

Attempts have been made to use ferroelectric materials in microwave applications with porous BSTO-based ceramics such as BSTO and an additional compound containing magnesium and oxygen. However, porous ceramics of the BSTO type can display certain deficiencies due to manufacturing process difficulties and expense, as well as overall electronic and microwave properties. These disadvantages may include electronic inhomogeneity, structural weakness, difficult reproducibility and process control during manufacture, and relatively large loss tangents (tanδ). In order for BSTO-based composites to be used in certain types of rugged commercial products, the stability of the electronic properties of these materials over temperature, time and bias must be improved. There is a need for the fabrication of tunable dielectric ceramic material having improved electronic properties, which may be adjusted for a particular intended use.

The present invention has been developed in view of the foregoing, and to address other deficiencies of the prior art.

SUMMARY OF THE INVENTION

The present invention provides ceramic ferroelectric composite materials comprising an electronically tunable dielectric phase, a calcium and oxygen-containing compound phase and, optionally, a rare earth oxide dopant. The materials may be used in low loss dielectric and ferroelectric applications such as wave-guides in phased array antennas and dielectrics in capacitors. The present invention provides ferroelectric materials having desired phase shift and have improved materials properties, which can be tailored for various applications. These properties include: (a) increased temperature stability; (b) increased bias and time stability; (c) decreased electronic loss, i.e., low loss tangents (tan$\delta$); (d) increased tunability; and (e) substantially lower Curie temperatures.

One embodiment of the present invention provides a ceramic ferroelectric composite comprising barium strontium titanate, $Ba_{1-x}Sr_xTiO_3$ ($BaTiO_3$—$SrTiO_3$), referred to herein as BSTO, and oxygen-containing calcium compounds (CaMO). The metal M of the CaMO compound may include at least one transition metal selected from Nb, Ti, Ta, V, Cr, Zr, Mo, Hf and W. Calcium oxide (CaO) may also be added to the composite material. The BSTO/CaMO material may be doped with rare earth (lanthanide) oxides. In a preferred embodiment, the calcium-containing compound comprises calcium niobate ($Ca_2Nb_2O_7$) and the rare earth oxide comprises cerium oxide ($CeO_2$), thus forming the composite material BSTO/$Ca_2Nb_2O_7$/$CeO_2$. The addition of such calcium oxides to BSTO, and the optional addition of rare earth oxides, creates a new class of ferroelectric materials having improved electronic and microwave properties, which can be tailored for specific applications.

An aspect of the present invention is to provide an electronically tunable dielectric material comprising at least one electronically tunable dielectric phase, at least one calcium and oxygen-containing compound, and at least one rare earth oxide dopant.

Another aspect of the present invention is to provide an electronically tunable dielectric material comprising at least one electrically tunable dielectric phase and at least one calcium and oxygen-containing compound which comprises at least one metal selected from Nb, Ti, Ta, V, Cr, Zr, Mo, Hf and W.

A further aspect of the present invention is to provide a method of making an electronically tunable dielectric material comprising mixing powders of at least one electronically tunable dielectric material, at least one calcium and oxygen-containing compound, and at least one rare earth oxide dopant; and sintering the, mixture.

Another aspect of the present invention is to provide a method of making an electronically tunable dielectric material comprising mixing powders of at least one electronically tunable dielectric material and at least one calcium and oxygen-containing compound which comprises at least one metal selected from Nb, Ti, Ta, V, Cr, Zr, Mo, Hf and W; and sintering the mixture.

A further aspect of the present invention to provide materials having electronic properties that can be tailored for specific applications such as for use in wave-guides in phased array antenna systems, or as dielectrics in capacitors.

Another aspect of the present invention to provide materials having low electronic loss (low loss tangents), increased tunability, substantially increased temperature, time and bias stability, and relatively low Curie temperature.

These and other aspects of the present invention will be more apparent from the following description.

DETAILED DESCRIPTION

The present invention relates to ceramic materials having desirable properties for applications such as phased array antenna systems and capacitors. These materials are advantageous in comparison with other currently employed ferroelectric materials because they have enhanced electronic properties, which can be tailored for specific applications. For example, the present materials have equivalent loss characteristics in comparison with current BSTO composites, combined with significantly increased lifetime and temperature stability. The present materials are attractive for commercial applications in transmission wire, wireless communications, low powered capacitors, pyroelectric guidance devices and the like. In addition, tunability of the materials remains high, e.g., well within requirements for applications such as phased array antenna systems.

The present electronically tunable ceramic compositions comprise at least one electronically tunable dielectric phase, such as barium strontium titanate. Barium strontium titanate of the formula $Ba_xSr_{1-x}TiO_3$ is a preferred electronically tunable dielectric material due to its favorable tuning characteristics, low curie temperatures and low microwave loss properties. In the formula $Ba_xSr_{1-x}TiO_3$, x can be any value from 0 to 1, preferably from about 0.15 to about 0.65. More preferably, x is from 0.3 to 0.6.

Other electronically tunable dielectric materials may be used partially or entirely in place of barium strontium titanate. An example is $Ba_xCa_{1-x}TiO_3$, where x can vary from about 0.2 to about 0.8, preferably from about 0.4 to about 0.6. Additional electronically tunable ferroelectrics include $Pb_xZr_{1-x}TiO_3$ (PZT) where x ranges from about 0.05 to about 0.4, lead lanthanum zirconium titanate (PLZT), lead titanate ($PbTiO_3$), barium calcium zirconium titanate ($BaCaZrTiO_3$), sodium nitrate ($NaNO_3$), $KNbO_3$, $LiNbO_3$, $LiTaO_3$, $PbNb_2O_6$, $PbTa_2O_6$, $KSr(NbO_3)$ and $NaBa_2(NbO_3)5$ $KH_2PO_4$.

The calcium and oxygen-containing compound CaMO of the present invention may include at least one transition/metal M selected from Nb, Ti, Ta, V, Cr, Zr, Mo, Hf and W, with Nb, Ti and Ta being preferred. For example, the CaMO phase of the present composite materials may comprise $CaTiO_3$, $CaSnO_3$, $CaZrO_3$, $Ca_2Nb_2O_7$, $Ca_2Ta_2O_7$, $CaWO_4$, $CaMoO_4$, $Ca_2Ti$, $CaCo_3$, $CaHfO_3$ and $CaGeO_3$. Calcium oxide (CaO) may be used in place of, or in addition to, the CaMO compounds. The calcium-containing compound is typically present in an amount up to about 80 weight percent of the material, preferably from about 0.1 to about 65 weight percent, and more preferably from about 1 to about 60 weight percent. In a particularly preferred embodiment, the calcium and oxygen-containing compound comprises from about 3 to about 50 total weight percent of the material.

Preferred materials of the present invention comprise $(Ba_{1-x}Sr_xTiO_3)(CaMO)$ ferroelectric composite material doped with rare earth oxides, where x is greater than or equal to zero and less than or equal to 1, and where the amount of the BSTO may range from about 20 to 99.75 weight percent of the composite. Preferably x is for 0.35 to 0.55. Preferably, the rare earth oxide is added in an amount less than or equal to 1.0 mole percent.

Suitable rare earth oxide dopants include oxides of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). Where the rare earth element is represented by M, the oxides are generally of the formula $M_2O_3$, although cerium gives cerium oxide $CeO_2$. The rare earth oxide additives of the present invention include all oxidation states of the rare earth elements. Thus, the materials may be represented generally as (BSTO)(CaMO)(REO). The calcium-containing compound may be, for example, $Ca_2Nb_2O_7$, so that the composite comprises BSTO—$Ca_2Nb_2O_7$—RE oxide. The doping may be carried out with combinations of rare earth oxides as opposed to individually.

Dielectric constant is related to the energy storage in the material. In general, the dielectric constant should be low. A lower dielectric constant is preferable for wave-guides so that impedance matching for the circuit is easier. A low dielectric constant does not decrease the phase shifting ability of the material if a sufficient length of the material is used, as insertion loss does not depend on dielectric constant. Also, since the loss tangent (tanδ) increases with increasing dielectric constant for these ferroelectric materials, lower dielectric constant materials tend to have lower loss tangents, and, therefore, less insertion loss. The dielectric constants of the present materials preferably range from about 15 to 1,500, and may be tailored to a particular application. In many cases, a lower dielectric constant on the order of 100 is needed for ease of matching into the circuit. A lower dielectric constant is preferable for waveguides so that impedance matching is easier. In other cases, such as varactor based filters, a higher dielectric constant such as 300 to 400 may be needed to achieve the correct capacitance required for a specific frequency band. For some RF applications, such as delay lines, very high dielectric constants, e.g., 800 to 1,000, are needed to obtain the correct delay.

The loss tangent (intrinsic to the material) is related to the power dissipation in a material, i.e., it is a measure of how a material serves to dissipate or absorb incident energy (microwave). A material is most effective in antenna devices when the loss tangent is in the range of 0.001 or less. The low loss tangent serves to decrease the insertion loss and hence increase the phase shifting per decibel of loss. Generally, as the frequency of operation increases, the dielectric loss tangent also increases. This restricts the microwave designer's ability to develop efficient high frequency devices.

As used herein, the term "electronically tunable dielectric material" means a material that exhibits a variable dielectric constant upon the application of a variable voltage. The term "voltage tunable dielectric material" as used herein means a material that exhibits a variable dielectric constant with a variable applied voltage. For voltage tunable materials, tunability is a measure of how much the dielectric constant changes with applied voltage and is defined as $T=(\epsilon_0-\epsilon_V)/\epsilon_0$ wherein T=tunability; $\epsilon_0$=dielectric constant with no applied voltage; and $\epsilon_V$=dielectric constant with an applied voltage. The amount of phase shift ability is directly related to tunability, therefore, higher tunabilities are desired. The tunability of a material under an electric field of 2.0 V/μm can range from 0% to 80% depending upon the material employed. For example, electronic tunabilities at an electric field strength of 2 V/μm may range from 2% to 22% or higher for the present materials.

In addition to these electronic properties, there are other advantages to the present compositions. The present materials exhibit favorable temperature stability. These materials also show a good resistance to breakdown even at high electrical field. For example, several of the present compositions have been held at 10 V/μm for several days without breakdown.

Another advantage is that the tuning remains almost the same while the dielectric loss is decreased from that of conventional composites. In addition, the dielectric constant of the ternary composites can be adjusted without decreasing tuning and increasing dielectric loss, which enable new RF applications not previously possible.

Time and bias stability may be defined as the intrinsic ability of the material to resist dielectric breakdown. Conversely, the lifetime of the material is the time necessary to induce intrinsic dielectric breakdown in the material. As know to those skilled in the art, exaggerated voltage and temperature test conditions may be correlated to the requirements of a given application.

The temperature stability of a material can be expressed by its temperature coefficient of dielectric constant, $T_{cp}$, which is defined as $T_{cp}=((\epsilon-\epsilon_0)/\epsilon_0)/(T-T_0)$ wherein $T_{cp}$= temperature coefficient of dielectric constant; $\epsilon$=dielectric constant at temperature T; and $\epsilon_0$=reference dielectric constant at reference temperature $T_0$. $T_{cp}$ is discussed in units of parts per million (ppm). As the $T_{cp}$ is decreased the temperature stability of the material increases. Temperature stability allows these materials to be used in applications such as high dielectric constant substrates. In addition, with increased temperature stability the material can be used in applications where there is a wide range of operating temperatures, thereby minimizing the need for environmental controls.

The Curie temperature ($T_c$) is the temperature at which the peak dielectric constant occurs for a material. It is also the temperature at which the material changes state from ferroelectric to paraelectric. For many applications, such as at high altitudes, low Curie temperatures are beneficial because the material will not then change phase at the operating temperature, thereby preventing the need for heating or protection circuitry.

There are many methods for producing the present composite materials. One of the basic methods begins by obtaining powders of barium titanate ($BaTiO_3$) and strontium titanate ($SrTiO_3$). The powders are then stoichiometrically mixed in a slurry of organic solvent, such as ethanol, and ball milled in a conventional manner using grinding media. An aqueous solvent, such as deionized water, can also be used as the solvent. This particular mixture is then air-dried and calcined at approximately 200–300 degrees below the sintering temperature for several hours. The resulting BSTO powder is then sieved and mixed with Ca compound, for example $Ca_2Nb_2O_7$, and, if applicable, the rare earth oxide, for example, $CeO_2$, in the correct ratios and re-ball milled in an organic solvent with a binder. Again, an aqueous solvent, such as deionized water, can be used as the solvent. The final mixture is then air-dried and subsequently dry pressed to near net shape at about 7,000 psi. The final samples are sintered in air at the correct temperatures. Sintering schedules may be ascertained by those skilled in the art using a dilatometer. After sintering, the sample can be machined and electroded for usage and analysis.

Tables 1 through 4 list compositions and electronic properties for some materials in accordance with the present invention.

TABLE 1

| Sample No. | x ($Ba_xSr_{1-x}TiO_3$) | CaMO Compound | Weight % CaMO Compound | Rare Earth Oxide (RE) | Mole % RE | Tunability 2 V/$\mu$m | Tunability 4 V/$\mu$m | Tunability 6 V/$\mu$m | Tunability 8 V/$\mu$m | $\epsilon'$ (1 MHz) | loss (1 MHz) | $\epsilon'$ (24 GHz) | tan$\delta$ (24 GHz) |
|---|---|---|---|---|---|---|---|---|---|---|---|---|---|
| 1 | 0.50 | $Ca_2Nb_2O_7$ | 3 | | | 11.9 | 24.5 | 34.0 | 41.3 | 896 | 0.001 | 631 | 0.036 |
| 2 | 0.50 | $Ca_2Nb_2O_7$ | 5 | | | 5.2 | 15.3 | 24.4 | 31.8 | 800 | 0.000 | 600 | 0.032 |
| 3 | 0.50 | $Ca_2Ta_2O_7$ | 5 | | | 7.7 | 19.7 | 29.1 | 36.1 | 882 | 0.005 | 711 | 0.028 |
| 4 | 0.50 | $Ca_2Ta_2O_7$ | 8 | | | 2.1 | 8.3 | 15.8 | 22.9 | 695 | 0.000 | 620 | 0.024 |
| 5 | 0.55 | $Ca_2Nb_2O_7$ | 0.5 | | | | | | | 7817 | 0.0478 | 1594 | 0.1925 |
| 6 | 0.55 | $Ca_2Nb_2O_7$ | 1 | | | 21.6 | 41.5 | 52.9 | 59.9 | 2271 | 0.0011 | 1493 | 0.0708 |
| 7 | 0.55 | $Ca_2Nb_2O_7$ | 3 | | | 10.8 | 26.5 | 37.6 | 44.9 | 1295 | 0.0017 | 831 | 0.0450 |
| 8 | 0.55 | $Ca_2Nb_2O_7$ | 4 | | | 9.1 | 23.9 | 36.0 | 45.2 | 1253 | 0.0011 | 782 | 0.0588 |
| 9 | 0.55 | $Ca_2Nb_2O_7$ | 5 | | | 6.3 | 19.0 | 31.0 | 40.2 | 1099 | 0.0006 | 777 | 0.0507 |
| 10 | 0.55 | $Ca_2Ta_2O_7$ | 5 | | | 9.5 | 24.2 | 35.0 | 42.6 | 1126 | 0.001 | 826 | 0.030 |
| 11 | 0.55 | $Ca_2Ta_2O_7$ | 8 | | | 3.9 | 13.8 | 23.5 | 31.4 | 843 | 0.000 | 689 | 0.027 |
| 12 | 0.55 | $Ca_2Nb_2O_7$ | 10 | | | 2.1 | 8.4 | 15.9 | 22.2 | 663 | 0.0019 | 514 | 0.0375 |
| 13 | 0.60 | $Ca_2Nb_2O_7$ | 5 | | | 8.3 | 24.0 | 37.1 | 46.8 | 1394 | 0.0011 | 968 | 0.0604 |

TABLE 2

| Sample No. | x ($Ba_xSr_{1-x}TiO_3$) | CaMO Compound | Weight % CaMO Compound | Rare Earth Oxide (RE) | Mole % RE | Tunability 2 V/$\mu$m | Tunability 4 V/$\mu$m | Tunability 6 V/$\mu$m | Tunability 8 V/$\mu$m | $\epsilon'$ (1 MHz) | loss (1 MHz) | $\epsilon'$ (24 GHz) | tan$\delta$ (24 GHz) |
|---|---|---|---|---|---|---|---|---|---|---|---|---|---|
| 14 | 0.50 | $Ca_2Nb_2O_7$ | 1 | $CeO_2$ | 0.8 | 9.6 | 22.1 | 32.4 | 40.3 | 950 | 0.001 | 640 | 0.040 |
| 15 | 0.50 | $Ca_2Nb_2O_7$ | 3 | $Y_2O_3$ | 0.8 | 10.2 | 21.8 | 31.1 | 38.5 | 802 | 0.001 | 529 | 0.045 |
| 16 | 0.50 | $Ca_2Nb_2O_7$ | 5 | $CeO_2$ | 0.8 | 3.7 | 11.8 | 20.2 | 27.6 | 756 | 0.000 | 457 | 0.015 |
| 17 | 0.50 | $Ca_2Nb_2O_7$ | 5 | $CeO_2$ | 1.0 | 2.9 | 10.3 | 17.9 | 24.2 | 637 | 0.001 | 438 | 0.016 |
| 18 | 0.50 | $Ca_2Ta_2O_7$ | 8 | $CeO_2$ | 1.0 | 2.7 | 8.1 | 13.8 | 18.7 | 527 | 0.000 | 392 | 0.013 |
| 19 | 0.55 | $Ca_2Nb_2O_7$ | 1 | $CeO_2$ | 0.8 | 18.4 | 33.5 | 43.6 | 50.9 | 1337 | 0.002 | 923 | 0.064 |
| 20 | 0.55 | $Ca_2Nb_2O_7$ | 3 | $CeO_2$ | 1.0 | 8.1 | 18.3 | 27.0 | 34.1 | 806 | 0.001 | 565 | 0.029 |
| 21 | 0.55 | $Ca_2Nb_2O_7$ | 5 | $CeO_2$ | 0.3 | 5.4 | 17.3 | 28.0 | 36.3 | 947 | 0.000 | 647 | 0.035 |
| 22 | 0.55 | $Ca_2Nb_2O_7$ | 5 | $CeO_2$ | 0.5 | 6.8 | 16.3 | 24.5 | 31.4 | 774 | 0.000 | 577 | 0.027 |
| 23 | 0.55 | $Ca_2Nb_2O_7$ | 5 | $CeO_2$ | 0.8 | 3.2 | 12.1 | 21.3 | 29.3 | 791 | 0.000 | 686 | 0.021 |
| 24 | 0.55 | $Ca_2Nb_2O_7$ | 5 | $Y_2O_3$ | 0.8 | 5.4 | 16.4 | 26.3 | 34.4 | 879 | 0.001 | 632 | 0.034 |
| 25 | 0.55 | $Ca_2Nb_2O_7$ | 5 | $CeO_2$ | 1.0 | 4.3 | 11.6 | 19.1 | 25.8 | 698 | 0.001 | 509 | 0.018 |
| 26 | 0.55 | $Ca_2Ta_2O_7$ | 5 | $CeO_2$ | 1.0 | 4.8 | 14.4 | 23.3 | 30.8 | 740 | 0.001 | 619 | 0.024 |
| 27 | 0.55 | $Ca_2Nb_2O_7$ | 5 | $CeO_2$ | 1.5 | 1.8 | 7.3 | 13.9 | 20.4 | 653 | 0.003 | 475 | 0.019 |
| 28 | 0.55 | $Ca_2Nb_2O_7$ | 5 | $CeO_2$ | 2.0 | 1.5 | 6.2 | 11.8 | 17.6 | 604 | 0.001 | 442 | 0.017 |
| 29 | 0.55 | $Ca_2Nb_2O_7$ | 5 | $Y_2O_3$ | 2.0 | 8.1 | 20.5 | 30.3 | 37.9 | 916 | 0.001 | 781 | 0.037 |
| 30 | 0.55 | $Ca_2Ta_2O_7$ | 8 | $CeO_2$ | 1.0 | 3.0 | 9.4 | 16.2 | 22.8 | 639 | 0.000 | 452 | 0.017 |
| 31 | 0.60 | $Ca_2Nb_2O_7$ | 5 | $CeO_2$ | 0.3 | 7.5 | 22.7 | 34.4 | 42.9 | 1179 | 0.000 | 803 | 0.045 |
| 32 | 0.60 | $Ca_2Nb_2O_7$ | 5 | $CeO_2$ | 0.8 | 3.6 | 13.8 | 24.8 | 34.0 | 980 | 0.001 | 674 | 0.034 |
| 33 | 0.60 | $Ca_2Nb_2O_7$ | 5 | $CeO_2$ | 1.0 | 5.6 | 17.7 | 27.7 | 34.8 | 906 | 0.001 | 628 | 0.027 |

TABLE 3

| Sample No. | x ($Ba_xSr_{1-x}TiO_3$) | CaMO Compound | Weight % CaMO Compound | Rare Earth Oxide (RE) | Mole % RE | Lifetime Time to 10 $\mu$A (85C, 10 V/$\mu$m) | $T_c$ (° C.) | $T_{cp}$ (ppm) |
|---|---|---|---|---|---|---|---|---|
| 34 | 0.50 | $Ca_2Nb_2O_7$ | 3 | $Y_2O_3$ | 0.8 | >24 | −90 | −0.0177 |
| 35 | 0.55 | $Ca_2Nb_2O_7$ | 1 | $CeO_2$ | 0.8 | >24 | −50 | −0.0277 |
| 36 | 0.55 | $Ca_2Ta_2O_7$ | 5 | | | 0 | −90 | −0.0179 |
| 37 | 0.55 | $Ca_2Nb_2O_7$ | 5 | $CeO_2$ | 0.3 | 13.2 | −110 | −0.0159 |
| 38 | 0.55 | $Ca_2Nb_2O_7$ | 5 | $CeO_2$ | 0.5 | >24 | −120 | −0.0145 |
| 39 | 0.55 | $Ca_2Nb_2O_7$ | 5 | $CeO_2$ | 0.8 | >24 | −125 | −0.0133 |
| 40 | 0.55 | $Ca_2Nb_2O_7$ | 5 | $Y_2O_3$ | 0.8 | >24 | −90 | −0.0177 |
| 41 | 0.55 | $Ca_2Nb_2O_7$ | 5 | $CeO_2$ | 1.0 | >24 | −140 | −0.0120 |
| 42 | 0.55 | $Ca_2Ta_2O_7$ | 5 | $CeO_2$ | 1.0 | >24 | −110 | −0.0150 |
| 43 | 0.55 | $Ca_2Nb_2O_7$ | 5 | $CeO_2$ | 1.5 | >24 | −150 | −0.0110 |
| 44 | 0.55 | $Ca_2Nb_2O_7$ | 5 | $CeO_2$ | 2.0 | >24 | −170 | −0.0098 |
| 45 | 0.55 | $Ca_2Nb_2O_7$ | 5 | $Y_2O_3$ | 2.0 | >24 | −110 | −0.0173 |
| 46 | 0.55 | $Ca_2Ta_2O_7$ | 8 | $CeO_2$ | 1.0 | >24 | −170 | |
| 47 | 0.60 | $Ca_2Nb_2O_7$ | 5 | $CeO_2$ | 0.3 | 0.02 | −90 | −0.0191 |
| 48 | 0.60 | $Ca_2Nb_2O_7$ | 5 | $CeO_2$ | 0.8 | >24 | −110 | −0.0156 |
| 49 | 0.60 | $Ca_2Nb_2O_7$ | 5 | $CeO_2$ | 1.0 | >24 | | |

TABLE 4

| Sample No. | x ($Ba_xSr_{1-x}TiO_3$) | CaMO Compound | Weight % CaMO Compound | Rare Earth Oxide (RE) | Mole % RE | Mole % CaO | Lifetime Time to 10 μA (85C, 10 V/μm) | $T_c$ (° C.) | $T_{cp}$ (ppm) |
|---|---|---|---|---|---|---|---|---|---|
| 50 | 0.55 | $CaTiO_3$ | 5 | $CeO_2$ | 0.5 |  | 0.0 |  |  |
| 51 | 0.55 | $CaTiO_3$ | 5 | $CeO_2$ | 1.0 |  | >24 | −35.0 | −4018.0 |
| 52 | 0.55 | $CaTiO_3$ | 5 | $CeO_2$ | 0.5 | 2.0 | >24 | −40.0 | −3699.0 |
| 53 | 0.55 | $CaTiO_3$ | 5 | $CeO_2$ | 1.0 | 2.0 | >24 | −40.0 | −3436.0 |
| 54 | 0.55 | $Ca_2Nb_2O_7$ | 3 |  |  | 2.0 | >24 | −80.0 | −2256.0 |
| 55 | 0.55 | $Ca_2Nb_2O_7$ | 3 | $CeO_2$ | 0.5 | 1.0 | >24 | −90.0 | −1817.0 |
| 56 | 0.55 | $Ca_2Nb_2O_7$ | 3 | $CeO_2$ | 0.5 | 2.0 | >24 | −90.0 | −1852.0 |
| 57 | 0.55 | $Ca_2Nb_2O_7$ | 3 | $CeO_2$ | 0.5 | 3.0 | >24 | −80.0 | −1984.0 |
| 58 | 0.55 | $Ca_2Nb_2O_7$ | 3 | $CeO_2$ | 1.0 | 2.0 | >24 | −100.0 | −1725.0 |
| 59 | 0.55 | $Ca_2Nb_2O_7$ | 5 | $CeO_2$ | 0.5 | 2.0 | 0.0 | <−50.0 | −605.0 |

The present materials can be produced by conventional manufacturing processes. For example, powder forms of $BaTiO_3$ and $SrTiO_3$ may be mixed to form the desired stoichiometry of the electronically tunable dielectric phase. The powders may be ball-milled in either a liquid solvent or deionized water, or dry mixed with ceramic grinding media for approximately 24 hours. These powders are then allowed to dry. The mixed powder is then calcined at temperatures of about 800° C. to about 1,200° C. to form BSTO. The calcined powder may then undergo another mixing step with powders of the calcium and oxygen-containing compound and the rare earth oxide dopant in the desired ratios to form the composite. This mixing step may be performed in a liquid medium or dry. During mixing conventional binders may or may not be added. The powders preferably have an average particle size of from about 0.1 to about 5 micron, more preferably from about 1.5 to about 2.5 micron. After mixing, the composite powder is then dried and ground to a workable particle size. At this point the powder may be made into several different forms that can be characterized as bulk materials, thick films or thin films.

The composite powder made using the above specifications may be compacted to form a shape. This process can be performed by isostatic pressing, uniaxial pressing or the like. The green ceramic body is then fired at the appropriate temperature in order to densify the compact. Electrodes may be placed on the sintered ceramic via a hybrid or thin film method to the specifications of a desired design.

The composite powder may also be blended with a polymeric binder for tape casting. The tape casting slurry may be pumped into a tape caster with a doctor blade set for a desired thickness. As the caster moves a carrier sheet such as Mylar under the doctor blade, the slurry forms a film of the desired thickness. The film is allowed to dry and then it is cut and/or slit to the shape needed. This green body is then fired with the appropriate binder burn out schedule. The sintered part may undergo an annealing stage dependent upon the quality of the fired tape. The tapes can then be electroded in a manner similar to the bulk material.

Alternatively, the composite powder can be mixed with a polymeric binder for screen printing. The slurry may be gently blended and then placed in a 3-roll mill or attritor mill to thoroughly mix the slurry. The ceramic ink is then printed using a screen with the appropriate mesh and emulsion for the desired finished print thickness. The ceramic may be printed onto any suitable substrate, e.g., a ceramic substrate such as MgO. The films are then metallized with a pattern necessary for the desired device. For example, in the case of varactors, over one hundred varactors can be put on a single chip and diced out for placement into microwave devices.

The fabrication processes primarily described herein deal with the production of bulk materials and thick film slurries. However, other suitable processing methods include die casting, injection molding, uniaxial pressing, isostatic pressing, tape casting, roll compaction and the like.

In accordance with an embodiment of the invention, the present materials may be provided in the form of a uniaxially pressed bulk part. Alternatively, large bulk parts of the present materials may be made by isostatic pressing. To press a uniaxial part, the powders may include a conventional binder to help hold the part together. For example, the pressed material may contain a basic acrylic binder in an amount of 2 percent by weight. The powder may be measured, placed in a metal die, and pressed to a pressure between 5,000 and 10,000 psi. In the case of isostatic pressing, the powder may be packed into a molded rubber container. The container is sealed with only a small tube opening. This tube is then attached to a vacuum pump and the air is pumped out of the bag. After the vacuum sealing process is done, the tube is clamped and the bag is placed in a container in an isostatic press. The isostatic press typically uses hydraulic pressure to apply from 30,000 to 60,000 psi of pressure to the part. The green ceramic density may be, for example, approximately 60 percent of theoretical.

In accordance with another embodiment, tape casting techniques may be used to make various types of components comprising the present materials. Tape cast parts may be made by adding a conventional dispersant and solvent system to a jar mill with the powders and liquid mixing media and mixing balls. Dispersion is performed typically from 18 to 24 hours. After the dispersion process, conventional plasticizers and binders are preferably added and the total mixture is mixing for several hours. The resultant tape slurry may then be de-aired by vacuum. At this point, the slurry may be injected into a tape caster and cast. The tape is then dried, cut and sintered. The sintering process typically includes a binder burn out stage and a sintering stage.

Another processing technique is to screen print a film of the present material. For example, powder forms of $BaTiO_3$ and $SrTiO_3$ may be mixed to form the desired stoichiometry. The powders may be ball-milled in either a liquid solvent, de-ionized water or dry mixed with ceramic grinding media for several hours. These powders are then allowed to dry. The mixed powder may then be calcined to form BSTO. The calcined powder then undergoes another mixing step with the calcium and oxygen-containing compound and the rare earth oxide dopant in the desired ratios to form the ceramic composite. This mixing may be performed in either a liquid medium or dry. The composite powder is then dried and ground to a workable particle size. At this point, the powder may be mixed in the desired ratio with a screen print binder system which preferably contains a combination of medium and solvent. The ratio of ceramic filler in many cases may be based on a 70 to 75 percent solids loading by weight. The resultant ink may be mixed on a 3-roll mill. However, other mixing methods may be suitable. A typical amount of time for mixing is about 30 minutes. During the mixing process, the powder may be allowed to flow through the mill to allow for uniform mixing. A viscosity test is preferably performed after the ink is made. The viscosities of the inks usually range from 35,000 to 65,000 cps, depending on the screens and the types of patterns which will be printed. Other tests such as rheology tests may be performed as needed depending on the application.

In one embodiment, once the present materials are printed or formed, microwave structures can be placed on top of the films. For example, a varactor may be made by printing a thick film ink of the tunable dielectric onto a substrate by a screen printing process. The dielectric ink may be forced through a wire screen in a pattern that is determined by the screen. The dielectric pattern is then sintered. The substrate then undergoes a conventional lift-off photolithography process and E-beam gold deposition process. The photoresist is then stripped and the patterned gold remains on the substrate. Hundreds of varactors may be made on the substrate. Each of the varactors may be cingulated by a dicing saw and each of the varactors can be tested by known techniques.

Other types of thick film structures include vertical capacitors where a metallic layer is printed and fired, then the ceramic is fired on top. The process for making this type of device may be similar to that described for the varactors. The difference is that a film of, e.g., platinum may be placed on the substrate prior to the thick film in order to form a bottom electrode. A subsequent step would be to place a pattern on top of the ceramic substrate. Thin films of these material can also be produced.

The present materials are particularly unique and ideal for microwave component designs because its tuning characteristics allow for the device to have tailored properties that vary. The variation allows for new concepts in design for filters which can vary the frequency of operation, for antennas to scan and track satellites electronically, and it allows for frequency hopping of microwave devices as well as many other applications. This unique property can be used to build tunable devices for RF, microwave, and mill-wave applications. These tunable devices include varactors (variable capacitors), tunable filters, phase shifters, tunable delay lines, VCO (voltage controlled oscillators), tunable dielectric resonators, tunable impedance-matching devices, and the like.

In accordance with an embodiment of the invention, the present materials may be incorporated in phased array antennas which are compact, light and relatively inexpensive to make and operate. The tunable dielectric materials can be used as replacements for the more expensive and high power driven ferrites currently used in large scale phased arrays. The present materials are also much more compact, and may be cheaper than materials used in mechanically scanning antennas. The present materials also have the advantage of lower loss without amplification than semiconductor tunable devices at microwave frequencies.

One of the applications of the present materials is to build high performance and low cost dielectric phase shifters. The phase of the dielectric phase shifters can be controlled by changing dielectric constant through biasing the tunable materials. The dielectric phase shifters can be in many configurations such as planar structures (microstrip line, coplanar), and 3-D structures (rectangle waveguide, finline) to meet different application requirements. The dielectric phase shifters have wide operation frequency range, low insertion loss, low consumption power, low intermodulation distortion and low cost, compared to common used ferrite and semiconductor-based phase shifters. Since phase shifters are a key device in a phased array antenna in both performance and cost of the whole antenna, the performance and cost of the antenna may be significantly improved by using the dielectric phase shifters instead of ferrite and semiconductor phase shifters.

Another application field of the present tunable materials is tunable filters. A tunable filter consists of one or more resonators. Each resonator has a inductor-capacitor (LC) resonating circuit. A filter can be tuned by changing inductance and/or capacitance of the resonator. Since the capacitance of the resonator can be easily changed by using the multi-phase tunable materials of the present invention, a low cost, high performance and compact tunable filter is achievable.

The dielectric tunable filters can find many applications in communication systems. Most current communication system use fixed filters. However, future communications require wideband communications using frequency-hopping techniques, so that large amounts of digital data can be transferred over the band. A critical component for these applications is a low cost fast-acting tunable filter. Current tunable filters cannot meet the requirements in both performance and cost. Digital data could be distributed or encoded over a band of frequencies in a sequence determined by controlling circuitry of the tunable filter. This would allow for several users to transmit and receive over a common range of frequencies.

The materials of the present invention provide-increased tuning characteristics, very stable structure with applied voltage, good loss characteristics, good temperature stability, and adjustable dielectric constant with desired tuning and loss. The present materials enable many new applications in broadband wireless communications that are currently not possible. In addition, the materials allow for components and antennas to be built at a low cost so that traditionally expensive products can be affordable to individuals, such as phased array antennas and tunable filters.

Whereas particular embodiments of this invention have been described above for purposes of illustration, it will be evident to those skilled in the art that numerous variations of the details of the present invention may be made without departing from the invention as defined in the appended claims.

What is claimed is:

1. An electronically tunable dielectric material comprising at least one electronically tunable dielectric phase, at least one calcium and oxygen-containing compound, and at least one rare earth oxide dopant, wherein the calcium and oxygen-containing compound comprises $CaSnO_3$, $Ca_2Nb_2O_7$, $Ca_2Ta_2O_7$, $CaWO_4$, $CaMaO_4$, $CaHfO_3$, and/or $CaGeO_3$, wherein the calcium and oxygen containing compound comprises from about 1 to about 60 weight percent of all the electronically tunable dielectric material.

2. The electronically tunable dielectric material of claim 1, wherein the calcium and oxygen-containing compound comprises from about 1 to about 20 weight percent of the material.

3. The electronically tunable dielectric material of claim 1, wherein the calcium and oxygen-containing compound comprises $Ca_2Nb_2O_7$.

4. The electronically tunable dielectric material of claim 1, wherein the rare earth oxide dopant comprises from about 0.1 to about 5 mole percent of the material.

5. The electronically tunable dielectric material of claim 1, wherein the rare earth oxide dopant comprises from about 0.25 to about 2 mole percent of the material.

6. The electronically tunable dielectric material of claim 1, wherein the rare earth oxide dopant comprises from about 0.5 to about 1.5 mole percent of the material.

7. The electronically tunable dielectric material of claim 1, wherein the rare earth oxide dopant comprises and oxide of Sc, Y, La, Ce, Pr, Nd, Sm, Dy, Gd, Ho and/or Er.

8. The electronically tunable dielectric material of claim 1, wherein the rare earth oxide dopant comprises $CeO_2$.

9. The electronically tunable dielectric material of claim 1, wherein the at least one electronically tunable dielectric phase is selected from barium strontium titanate, barium titanate, strontium titanate, barium calcium titanate, barium calcium zirconium titanate, lead titanate, lead zirconium titanate, lead lanthanum zirconium titanate, lead niobate, lead tantalate, potassium strontium niobate, sodium barium niobate/potassium phosphate, potassium niobate, lithium niobate, lithium tantalate, lanthanum tantalate, barium calcium zirconium titanate, sodium nitrate, and combinations thereof.

10. The electronically tunable dielectric material of claim 1, wherein the material has a lifetime of at least 24 hours at 85° C. and 10 $\mu A$ applied at 10 $V/\mu A$.

11. The electronically tunable dielectric material of claim 1, wherein the material has a tunability at an electric field strength of 2 $V/\mu A$ of at least 2 percent.

12. An electronically tunable dielectric material comprising at least one electronically tunable dielectric phase and at least one calcium and oxygen-containing compound comprising $CaSnO_3$, $Ca_2Nb_2O_7$, $Ca_2Ta_2O_7$, $CaWO_4$, $CaMoO_4$, $CaHfO_3$, and/or $GaGeO_3$, wherein the calcium and oxygen-containing compound comprises from about 1 to about 60 weight percent of all the electronically tunable dielectric material.

13. The electronically tunable dielectric material of claim 12, wherein the calcium and oxygen-containing compound comprises from about 1 to about 20 weight percent of the material.

14. The electronically tunable dielectric material of claim 12, wherein the calcium and oxygen-containing compound comprises $Ca_2Nb_2O_7$ and/or $CaTa_2O_7$.

15. The electronically tunable dielectric material of claim 12, wherein the calcium and oxygen-containing compound comprises $Ca_2Nb_2O_7$.

16. The electronically tunable dielectric material of claim 12, wherein the material further comprises at least one rare earth oxide dopant.

17. The electronically tunable dielectric material of claim 16, wherein the rare oxide dopant comprises from about 0.1 to about 5 mole percent of the material.

18. The electronically tunable dielectric material of claim 16, wherein the calcium and oxygen-containing compound comprises wherein the rare earth oxide dopant comprises an oxide of Sc, Y, La, Ce, Pr, Nd, Sm, Dy, Gd, Ho and/or Er.

19. The electronically tunable dielectric material of claim 16, wherein the rare earth oxide dopant comprises $CeO_2$.

20. The electronically tunable dielectric material of claim 12, wherein the at least one electronically tunable dielectric phase is selected from barium strontium titanate, barium titanate, strontium titanate, barium calcium titanate, barium calcium zirconium titanate, lead titanate, lead zirconium titanate, lead lanthanum zirconium titanate, lead niobate, lead tantalate, potassium strontium niobate, sodium barium niobate/potassium phosphate, potassium niobate, lithium niobate, lithium tantalate, lanthanum tantalate, barium calcium zirconium titanate, sodium nitrate, and combinations thereof.

21. The electronically tunable dielectric material of claim 12, wherein the at least one electronically tunable dielectric phase comprises barium strontium titanate.

22. The electronically tunable dielectric material of claim 21, wherein the barium strontium titanate is of the formula $BaxSr_{1-x}TiO_3$, where x is from about 0.15 to about 0.6.

23. The electronically tunable dielectric material of claim 12, wherein the materials has a lifetime of at least 24 hours at 85° C. and 10 $\mu A$ and applied at 10 $V/\mu A$.

24. The electronically tunable dielectric material of claim 12, wherein the material has a tunability at an electric field strength of 2 $V/\mu A$ of at least 2 percent.

25. A method of making an electronically tunable dielectric material comprising: mixing powders of at least one electronically tunable dielectric material, at least one calcium and oxygen-containing compound, wherein the calcium and oxygen-containing compound comprises $CaSnO_3$, $Ca_2Nb_2O_7$, $Ca_2Ta_2O_7$, $CaWO_4$, $CaMoO_4$, $CaHfO_3$, and/or $CaGeO_3$, wherein the calcium and oxygen-containing compound comprises from about 1 to about 60 weight percent of all the electronically tunable dielectric material, and at least one rare earth oxide dopant; and sintering the mixture.

26. The method of claim 25, wherein the powders have average particle sizes of from about 0.1 to about 5 microns.

27. A method of making an electronically tunable dielectric material comprising: mixing powders of at least one electronically tunable dielectric material and at least one calcium and oxygen-containing compound comprising $CaSnO_3$, $Ca_2Nb_2O_7$, $Ca_2Ta_2O_7$, $CaWO_4$, $CaMoO_4$, $CaHfO_3$, and/or $CaGeO_3$, said calcium and oxygen-containing compound comprises from about 1 to about 60 weight percent of all the electrically tunable dielectric material, and sintering the mixture.

28. The method of claim 27, wherein the powders have average particle sizes of from about 0.1 to about 5 microns.

29. The electronically tunable dielectric material of claim 1, wherein the calcium and oxygen-containing compound comprises from about 3 to about 50 weight percent of the material.

30. The electronically tunable dielectric material of claim 1, wherein the rare oxide dopant comprises from about 0.3 to about 2.0 mole percent of the material.

* * * * *